United States Patent [19]
Lloyd et al.

[11] Patent Number: 4,600,620
[45] Date of Patent: Jul. 15, 1986

[54] ARTICLE SUITABLE FOR WIPING SURFACES

[75] Inventors: John Lloyd; George K. Rennie, both of Merseyside, England

[73] Assignee: Lever Brothers Company, New York, N.Y.

[21] Appl. No.: 522,272

[22] Filed: Aug. 11, 1983

[30] Foreign Application Priority Data

Aug. 13, 1982 [GB] United Kingdom ................ 8223346
Feb. 11, 1983 [GB] United Kingdom ................ 8303872

[51] Int. Cl.$^4$ ................................................ B32B 3/00
[52] U.S. Cl. .................................. 428/195; 15/104.93;
428/178; 428/211; 428/284; 428/286; 428/296;
428/320.2; 428/321.1; 428/321.5; 428/340;
428/913; 428/198

[58] Field of Search ............... 428/284, 248, 296, 247,
428/255, 109, 110, 913, 198, 195, 178, 340,
305.5, 320.2, 321.1, 321.5, 211; 15/104.93

[56] References Cited

U.S. PATENT DOCUMENTS

| | | | |
|---|---|---|---|
| 2,980,941 | 12/1958 | Miller | 15/506 |
| 3,144,671 | 8/1964 | Gould et al. | 15/104.93 |
| 3,452,128 | 6/1969 | Rains | 264/126 |
| 3,485,705 | 12/1969 | Harmon | 161/59 |
| 3,501,369 | 3/1970 | Drelich et al. | 428/296 |
| 3,879,257 | 4/1975 | Gentile et al. | 156/183 |
| 3,949,130 | 4/1976 | Sabee et al. | 428/296 |
| 3,993,820 | 11/1976 | Repke | 428/296 |
| 4,082,878 | 4/1978 | Boe et al. | 428/195 |
| 4,129,132 | 12/1978 | Butterworth et al. | 128/287 |
| 4,154,883 | 5/1979 | Elias | 428/171 |
| 4,307,143 | 12/1981 | Meitner | 15/104.93 |
| 4,515,703 | 5/1985 | Haq | 15/104.93 |

FOREIGN PATENT DOCUMENTS

| | | |
|---|---|---|
| 58633 | 2/1981 | European Pat. Off. . |
| 67016 | 12/1982 | European Pat. Off. . |
| WO80/01455 | 7/1980 | World Int. Prop. O. . |
| 582006 | 11/1946 | United Kingdom . |
| 656013 | 8/1951 | United Kingdom . |
| 718529 | 11/1954 | United Kingdom . |
| 1068432 | 5/1967 | United Kingdom . |
| 1130857 | 10/1968 | United Kingdom . |
| 1326080 | 10/1970 | United Kingdom . |
| 1238078 | 7/1971 | United Kingdom . |
| 1238192 | 7/1971 | United Kingdom . |
| 1265238 | 3/1972 | United Kingdom . |
| 1401231 | 7/1975 | United Kingdom . |
| 1432978 | 4/1976 | United Kingdom . |
| 1522759 | 8/1978 | United Kingdom . |
| 1574498 | 9/1980 | United Kingdom . |
| 1579269 | 11/1980 | United Kingdom . |
| 2024709 | 9/1982 | United Kingdom . |

Primary Examiner—James J. Bell
Attorney, Agent, or Firm—Milton L. Honig; James J. Farrell

[57] ABSTRACT

A wiping cloth or the like, suitable for wiping glossy hard surfaces, comprises a sheet substrate carrying a liquid, for example, a streak-free cleaning composition. At least one external (wiping) surface of the substrate has flattened areas including thermoplastic material coalesced by the application of heat and pressure and open areas, and this external surface is immediately adjacent to a core of bulky high-porosity fibrous sheet material.

16 Claims, 4 Drawing Figures

ARTICLE SUITABLE FOR WIPING SURFACES

The present invention relates to an article suitable for wiping surfaces, especially hard surfaces. The article is in the form of a web or sheet substrate having at least two layers, and carrying a liquid active material, for example a cleaning or disinfectant composition, that will deliver a benefit to the surface being wiped.

The invention is especially, but not exclusively, applicable to an article for wiping glossy hard surfaces, such as mirrors, windows, chrome, glazed ceramic tiles, and gloss paintwork, to give a substantially streak-free result. The article of the invention is characterized by a particular surface construction giving especial advantages in the wiping of hard glossy surfaces.

GB 582 006 (British Celanese) discloses the glazing of batting material containing thermoplastic fibres by applying heat and pressure to form a "skin" on each side while leaving the main body of fibres unaffected. The glazed batting material is useful for thermal insulation.

GB 1 068 432 (Bigelow-Sanford) discloses a heavy-duty needled nonwoven fabric suitable for carpet backing, consisting mainly of thermoplastic (polyolefin or polyester) fibres. The fibres on at least one exterior surface are bonded or fused together to a flattened and hardened condition as by melting the surface fibres without bonding or fusing the fibres in the interior of the fabric.

GB 1 130 857 (Huyck) discloses a laminate for bandages and dressings, having an inner absorptive layer and an outer (surface) layer of thermoplastic hydrophobic fibrous material, at least some fibres from the outer layer extending into the inner layer and the outer surface of the outer layer having been pressed at fusion temperature so as to lay down any projecting fibres and give a smooth finish.

GB 1 265 238 (Schickedanz) discloses a composite material suitable for use in sanitary towels and similar products, having an inner layer of bulky absorbent material, for example, cellulose fibres. An outer layer of thermoplastic mesh, typically of mesh size 0.5 to 1.0 cm, is fusion-bonded on to one or both sides of the inner absorbent layer.

U.S. Pat. No. 3,879,257 (Scott Paper Co.) discloses a single-ply fibrous web useful for towels and wipers. A soft absorbent core is sandwiched between stronger surface regions of higher fibre concentration, the surface regions containing bonding material applied to the web in a fine spaced-apart pattern.

U.S. Pat. No. 4,307,143 (Kimberly-Clark) discloses a wipe consisting of a meltblown synthetic microfibrous web treated with a wetting agent and pattern-bonded by high-temperature embossing.

U.S. Pat. No. 4,082,878 (Freudenberg) discloses an absorbent sheet material suitable for use as a cleaning cloth. A consolidated nonwoven fabric has printed onto each surface a three-dimensional superelevated pattern of foam rubber that provides a squeegee-like action when wiped over a wet surface.

The present invention provides an article suitable for wiping surfaces, said article comprising a sheet substrate carrying a liquid active material (as hereinafter defined) and having (a) a core of bulky high-porosity fibrous sheet material having a base weight of at least 30 g/m$^2$, and, immediately adjacent to said core, (b) at least one external wiping surface having flattened areas of thermoplastic material coalesced by the application of heat and pressure and open areas.

The core (a) of bulky high-porosity material is absorbent and highly efficient at capturing soil and any liquid present when the article is used to wipe a surface. This material is of relatively low density and high void volume, that is to say, the volume occupied by voids is very much larger than that occupied by fibres. The porosity is defined as follows:

$$\text{porosity} = \frac{\text{void volume}}{\text{total volume}} \times 100$$

In practice materials having porosities within the range of from 80 to 99% are preferred and those having porosities within the range of from 85 to 95% are especially preferred, the upper limit arising from the requirement that the structure must not be so open as to permit the passage of soil through the material without entrapment by the fibre network.

It will be apparent that high porosities may be achieved both by random arrangements of fibres, as in lofty (advantageously creped) paper and nonwoven fabrics, and also by means of distinct regions of high and low densities. Both types of structure can be used to advantage in the present invention and examples of both are given in the attached Table 1. Suitable materials may be produced by both wet-laid and dry-laid processes.

TABLE 1

| Trade Name (* denotes Trade Mark) | Manufacturer | Fibre mix | Base weight (g/m$^2$) | Porosity | Characteristics |
|---|---|---|---|---|---|
| Hi-Loft* 3051 | Scott Paper Co (USA) | wood pulp | 85 | 92 | random wet-laid lofty paper web |
| Tamlon* 286 | Tampella (Finland) | 80% viscose, 20% wood pulp | 50 | 90 | wet-laid apertured nonwoven fabric |
| Mitsubishi* TCF | Mitsubishi Nippon (Japan) | viscose | 40 | 90 | spun-laced web with line bonding |
| Storalene* 610-60 | Stora-Copparberg (Sweden) | 55% viscose, 40% cotton linters, 5% polyacrylamide | 60 | 92 | wet-laid nonwoven fabric |
| Sontara* 84 12 | Du Pont (USA) | 70% viscose, 30% polyester | 60 | 90 | spun-laced apertured nonwoven fabric |

The base weight of the core (a) is preferably at least 40 g/m$^2$, more preferably at least 50 g/m$^2$, and may be as high as 120 g/m$^2$ or even 150 g/m$^2$.

Materials of this type are excellently suited to wiping surfaces both wet and dry but are in some cases prone to linting, that is to say, to leaving behind on the surface fibre fragments. The problem of linting is solved or substantially alleviated, according to the present invention, by the presence of the special surface (b). Surprisingly, the presence of this type of wiping surface has also been found to give improved cleaning and streak-free performance in the wiping of glossy hard surfaces, and to be of value even in cases where linting does not present a significant problem.

The wiping surface (b) consists of flattened areas of thermoplastic material and open areas. The surface coverage by the thermoplastic material is relatively high, and should generally be such that the fibres of the core material are substantially prevented from coming into contact with any surface being wiped. If the core material is one with a tendency to lint, the average size of the open areas should preferably not be substantially greater than the average fibre length; for a core of woodpulp or other papermaking fibres, this will be of the order of 2–3 mm, but for synthetic nonwoven fabrics the fibre length may be considerably greater. The surface structure of the invention is, however, also of benefit with core materials having no tendency to lint, for example spun-laced nonwoven fabrics which have very long fibres, and there is then no simple relationship between the size of the open areas and the fibre length of the core material. Control of the size of the open areas in the wiping surface (b) may be achieved in various ways depending on the origin of the surface structure.

The surface structure (b) characteristic of the invention may be generated by various methods, the coalesced thermoplastic material that forms the flattened areas being derived either from the core material itself, if that contains a sufficiently high proportion of thermoplastic fibres, or from an external source. In the latter case, it is unnecessary for the core material to contain thermoplastic fibres.

Such an external source may advantageously be an outer layer of thermoplastic web or sheet material laminated by fusion bonding onto the core material. Such web or sheet material must have a sufficiently open structure so that after the application of heat and pressure, so as simultaneously to effect fusion bonding and to produce the flattened surface areas characteristic of the invention, open areas of sufficient size and number will be left to allow liquid to pass in and out of the core material. It must be remembered that the fusion process will cause spreading as well as flattening, so that the open areas of the outer layer will be reduced in size when it is laminated onto the core material.

According to a first, especially preferred embodiment of the invention, the source of the wiping surface (b) is a separate outer layer of lightweight (8 to 25 g/m$^2$) heat-sealable fibrous sheet material, laminated onto the core material.

The lamination is effected by the application of heat and pressure, so as simultaneously to cause fusion bonding and to generate on the surface flattened areas of coalesced fibres.

Thus in this embodiment the article of the invention comprises a sheet substrate carrying a liquid active material (as hereinafter defined) and having a core (a) of bulky high-porosity fibrous sheet material having a base weight of at least 30 g/m$^2$, and, laminated onto said core material, a layer of heat-sealable fibrous sheet material having a base weight of from 8 to 25 g/m$^2$ fusion-bonded onto the core (a) by the application of heat and pressure to such an extent that fibres at its outer surface substantially lose their fibrous identity and are coalesced into flat areas to give a wiping surface (b).

The outer layer preferably has a base weight within the range of from 10 to 20 g/m$^2$. It consists of a material that is heat-sealable, that is to say, one which contains a substantial proportion, preferably at least 30% by weight, of thermoplastic fibres. As the thermoplastic fibres, polypropylene fibres are especially preferred. The outer layer may be of either dry-laid nonwoven fabric or of woven fabric derived from filaments, and has a base weight lower than, preferably substantially lower than, that of the bulky low-density core layer. Fabrics having base weights in the region of 15 g/m$^2$ have been found to give good results.

As previously indicated, the outer layer is of relatively open structure so that, despite the spreading caused by the fusion-bonding process, access to the adjacent bulky core by soil and/or liquid is possible in the finished product.

Materials suitable for use as the outer layer include the well-known coverstocks for diapers and sanitary towels. Examples of these include Novelin (Trade Mark) S 15 and US 15, manufactured by Suominen (Finland), which are dry-laid nonwoven fabrics derived from a polypropylene/ viscose fibre mix and have base weights of about 15 g/m$^2$. Other suitable materials include: Bondina LS 5010, manufactured by Bondina Ltd (UK), which is derived from polypropylene fibres and has a base weight of about 10 g/m$^2$; Paratherm PS 315 (Lohmann), which is derived from 50% viscose/50% polypropylene fibres and has a base weight of 16 g/m$^2$; and Corovin P PS MED, derived from polypropylene fibres and having a base weight of about 20 g/m$^2$.

The outer layer is bonded to the adjacent core material at least partially by fusion-bonding. Heat and pressure are applied to the outer layer so that some of the thermoplastic fibres are partially or wholly melted and bond with the fibres of the adjacent bulky core material. The bonding between the two layers need not be exclusively by fusion-bonding but may be partially by other means, for example, mechanical entanglement (such as needle punching). Some fusion-bonding of the outer layer to the bulky low-density core must, however, take place such that some fibres of the former coalesce to such an extent that they substantially lose their fibrous identity at the outer surface, to give the flattened areas of the surface (b). Such fusion-bonding will require the application of pressure (most conveniently from the side of the outer layer, if such a layer is present on one side of the substrate only), simultaneously with heating.

It is advantageous for the outer layer to consist of a nonwoven fabric containing a mixture of different fibres, some of which are thermoplastic and some of which are not. The non-thermoplastic fibres remain unchanged by the heat and pressure treatment and give increased robustness and integrity to the substrate. Mixtures of polypropylene and viscose fibres, as in the materials Novelin S15 and US15 and Paratherm PS 315 mentioned above, are especially preferred.

According to a second embodiment of the invention, the source of the surface structure (b) characteristic of the invention is an outer layer of a different type, namely, a sheet of thermoplastic netting material having a mesh size not greater than about 5 mm and a base weight of 2 to 20 g/m$^2$, fusion-bonded by the application of heat and pressure to the core material (a).

Such mesh or netting material is produced by slitting and stretching sheets of thermoplastic film material, for example, polyethylene or polypropylene. A range of suitable materials is manufactured by Smith & Nephew (UK). These nets may have many different patterns, and the term "mesh size" here denotes the maximum dimension of the apertures in the sheet. Examples of these materials include X230, having a mesh size of about 2 mm, and X3530, having a mesh size of about 1 mm; both of these have base weights of 18 g/m$^2$ and are manufactured by Smith & Nephew.

As with the outer layer of fibrous material used in the first embodiment of the invention, the sheet of thermoplastic netting is fusion-bonded by the application of heat and pressure to the core material (a) to give the surface (b). During this process a certain amount of spreading takes place so that the effective mesh size is reduced: thus a netting having a mesh size of 5 mm will, in general, substantially reduce the linting of a core material having fibres of normal papermaking length (2-3 mm). The initial mesh size of the netting is preferably less than 3 mm and more preferably less than 2 mm.

According to a third embodiment of the invention, the coalesced and flattened thermoplastic material of the wiping surface (b) is not derived from a discrete layer of porous material, but is applied in a discontinuous manner to the surface of the core material (a) using heat and pressure. The thermoplastic material may, for example, be applied as a powder, or using a printing method. Sufficient thermoplastic material must be applied to provide a surface coverage such that, in use, contact between the bulky core material (a) and a surface being wiped is substantially prevented; on the other hand, open areas of sufficient size and number must be present that liquid can pass in and out of the core. As in previously described embodiments, if the core material is one that tends to lint, the open areas should in general not be substantially larger than the average fibre length of the core material.

Furthermore, there should not be any substantial degree of penetration of the thermoplastic material into the core material, other than the minimal amount required for adhesion. This is essentially a surface treatment, leaving the bulk of the core material unaffected.

Of the three embodiments of the invention so far discussed, the first, in which the surface structure is derived from coalesced thermoplastic fibres, is preferred. According to a fourth embodiment, which is in effect a variation of the first, the bulky core material (a) itself may contain sufficient thermoplastic fibres to render a heat and pressure treatment effective, even in the absence of a separate outer layer, to give a wiping surface in accordance with the present invention. In this embodiment the bulky layer preferably contains at least 30% by weight, and more preferably at least 45% by weight, of thermoplastic fibres, for example, polyester, polyethylene or polypropylene.

An example of a suitable material of this type is XLA 150, manufactured by Bonded Fibre Fabric Ltd., which consists approximately of 50% by weight of polyester fibres and 50% by weight of viscose fibres. Its base weight—150 g/m$^2$—is very high, and its porosity, prior to the treatment of the invention, is 97%. This is reduced slightly by the heat and pressure treatment according to the invention.

The surface structure that characterises the article of the invention is produced by the application of heat and pressure. In the case of the first, third and fourth embodiment, this treatment may for example be carried out by passing the substrate between heated rollers.

The outer surface then becomes relatively flat, with flat regions composed of coalesced thermoplastic material, and open areas. This may be demonstrated by optical or electron microscopy. The open areas are of course essential to provide a passage for the liquid active material carried by the article of the invention, and for soil pick-up and transfer to the bulky core material. They are also necessary in order to give the substrate sufficient flexibility.

It has been found that this type of surface gives especially good cleaning and non-streak results on glossy surfaces. It may be postulated (but the scope of the invention is not to be limited by this hypothesis) that the flat regions of melted thermoplastic material assist in directing soil and/or liquid into the interior of the article, that is to say, into the absorbent bulky low-density core.

The substrate of the article of the invention may of course include additional layers as well as those specified above, provided that at least one outer surface is as specified under (b) above and is immediately adjacent to a bulky core as specified under (a) above.

In a simple wipe, it is advantageous for both surfaces of the article to be as specified under (b) above so that the consumer does not need to distinguish between them. Furthermore two bulky low-density core layers each with a type (b) outer surface may be positioned back-to-back, optionally with further layers between them. Other arrangements will readily suggest themselves to the worker skilled in the art.

The article of the invention carries a liquid active material that will deliver a benefit to the surface being wiped. The term "active material" as used here is not restricted to surface-active or detergent-active materials but includes any beneficial material.

For use in wiping glossy surfaces to give a substantially streak-free result, the liquid active material is advantageously as defined in EP 67 016 (Unilever), (Case C.1094), that is to say, it is a homogeneous aqueous solution having a surface tension of less than 45 mNm$^{-1}$, preferably less than 40 mNm$^{-1}$, and, when applied to a surface and allowed to dry, dries substantially without forming discrete droplets or particles larger than 0.25 $\mu$um (preferably 0.1 $\mu$um).

The formation of discrete droplets or particles larger than 0.25 $\mu$um on drying causes scattering of visible light (wavelength 0.4-0.7 $\mu$um), which is perceived by the eye as streaking. Preferably the liquid composition dries substantially without forming discrete droplets or particles larger than 0.1 $\mu$um.

The liquid cleaning composition is in the form of a homogeneous aqueous solution. The lowering of surface tension (the value for water is above 70 mNm$^{-1}$) is conveniently achieved by the inclusion in the liquid composition of a surface-active agent, preferably at a concentration not exceeding 1.5% by weight, more preferably at a concentration within the range of from 0.009 to 1% by weight, especially from 0.02 to 0.2% by weight.

Nonionic surface-active agents are preferred, and one class of such surfactants that give good streak-free results is comprised by the condensation products of $C_{16}$–$C_{20}$ alcohols, especially straight-chain primary alcohols, with 15 to 20 moles of ethylene oxide. An example is the condensation product of tallow alcohol with 18 moles of ethylene oxide.

Preferably the electrolyte content of the liquid composition is as low as possible, and any water present is demineralised.

The liquid composition may advantageously contain, as well as water, at least one water-miscible solvent, preferably a lower aliphatic alcohol such as ethanol or isopropanol.

Numerous examples of streak-free cleaning compositions are given in EP 67 016 (Unilever) (Case C.1094).

For streak-free cleaning it is important that the substrate be substantially free of streak-forming impurities which might be leached out by the liquid composition and deposited on the wiped surface as streaks. Some substrates may inherently be free of such impurities; many papers or nonwoven fabrics, however, contain binders and some of these can cause streaking problems. Traces of bonding agent, size, clays, fluorescers, fibre lubricants, emulsifiers or other processing materials may also be present in papers and nonwoven fabrics and these can also cause streaking. Accordingly the substrate is preferably pretreated to remove any materials associated therewith that might cause, or contribute to, streaking.

The treatment may conveniently comprise prewashing the substrate with a solvent capable of removing the impurities, before the application of the liquid composition. In some cases washing with hot to boiling demineralised water may be necessary, while in others a presoaking in an excess of the liquid composition itself may suffice.

Some binders used in paper and nonwoven fabrics, notably crosslinked katpolyalkylimine, do not appear to cause streaking problems, and substrates in which only this type of binder is present may not require a prewashing treatment.

In the article of the invention the liquid active material, which is advantageously a streak-free cleaning composition, may be carried by any suitable method. In its simplest form, the substrate is impregnated with the liquid active material. In the case of a highly viscous liquid, a coating method may be suitable, but the streak-free cleaning compositions with which the invention is especially concerned are generally highly mobile liquids, and impregnation rather than coating will be appropriate.

If the article of the invention is of the wet impregnated type it must of course be packaged in such a way that loss of volatile components of the liquid active material by evaporation is substantially eliminated. The articles may, for example, be packaged individually in moisture-proof sachets, for example, of metal foil and/or plastics film. Alternatively, a continuous roll of wet substrate, perforated at intervals, can be packaged in a container with a tight closure, as is known, for example, for various personal cleansing and baby-cleaning wipes currently on the retail market.

According to a highly preferred embodiment of the invention, however, the article carries a liquid active material in a controlled release form. The liquid active material may then be released over a relatively long period, as required by the user, and the article may be to a certain extent reusable. Advantageously the liquid is contained within some medium that will release liquid only when a stimulus, for example, pressure is applied.

The liquid may, for example, be contained in pressure-rupturable microcapsules distributed through or coated onto the substrate. If the microcapsules are included in the stock from which the substrate is made, they will be distributed throughout the substrate; alternatively microcapsules may be coated onto a preformed substrate.

Alternatively, the liquid may be contained within a highly porous polymer, as described and claimed in EP 68 830 (Unilever) (Case C.1300). The polymer is a pressure-sensitive porous polymeric material capable of retaining at least 5, preferably at least 10, times its own weight of water or corresponding amounts of other liquids and of releasing liquid when hand pressure is applied. A preferred type of porous polymer is the polymerisation product of a high-internal-phase emulsion in which the aqueous internal phase constitutes at least 90% by weight of the emulsion, and the continuous phase contains hydrophobic monomer. Styrene homo- or copolymers are of especial interest.

When the liquid active material is contained within a controlled-release medium, a preferred form of article according to the invention is a sandwich structure in which that medium is positioned between two substrates at least one, and preferably both, of which is or are in accordance with the present invention.

Advantageously each substrate may have a surface of type (b) as defined previously on both of its faces. This surface is thermoplastic and enables the two substrates to be heat-sealed together. Thus for each substrate one type (b) surface is usable for wiping while the other is heat-sealed to the other substrate. However other bonding methods may be used when each substrate has a type (b) surface on one side only.

If the controlled-release medium is in the form of discrete granules or particles, for example, microcapsules or polymer beads, the substrates may readily be heat-sealed together both at the edges and at other locations without problems. One convenient arrangement utilises a grid pattern of heat-sealing so that isolated pockets of liquid-carrying medium are produced; this helps to ensure that the liquid-carrying medium is distributed relatively uniformly over the area of the article.

If the liquid-carrying medium is in the form of a non-heat-sealable porous polymer that cannot be reduced to powder or granules without destroying its void system, a sheet of polymer may be sandwiched between the two substrates. Advantageously, an array of squares between two substrates heat-sealed together in a grid pattern may be employed as described in the aforementioned EP 68 830.

Some articles according to the invention constructed in this manner will now be described in more detail, by way of example only, with reference to the accompanying drawings, in which.

Figure 1:
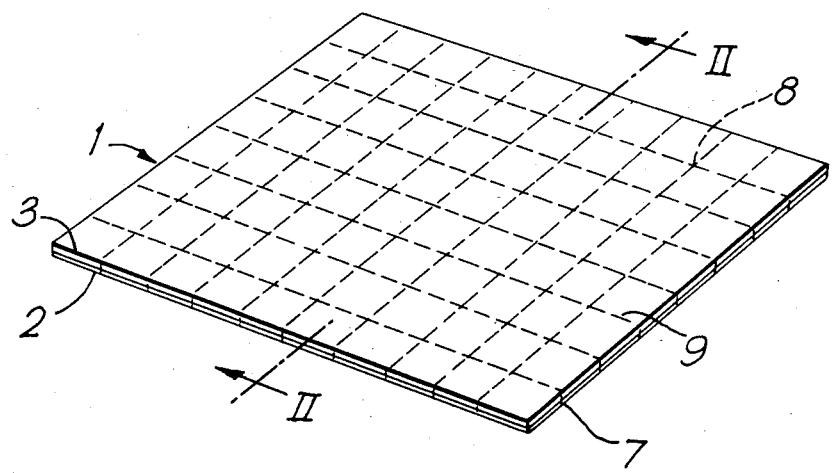
FIG. 1 is an isometric view of a first article.
Figure 2:
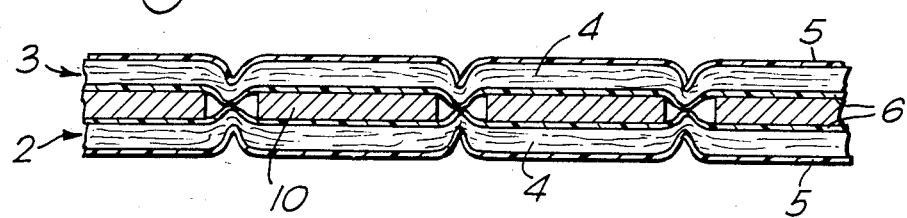
FIG. 2 is a fragmentary section along the line II—II of FIG. 1.

Referring now to FIGS. 1 and 2 of the accompanying drawings, a wiping cloth 1 suitable for use on glossy hard surfaces comprises a lower substrate 2 and an upper substrate 3. Each substrate consists of a core 4 of bulky high-porosity fibrous sheet material, for example, Hi-Loft (Trade Mark) 3051 lofty low-density wet-strength paper (base weight 85 g/m$^2$, porosity 92), carrying on its outer side a layer 5 of lightweight thermoplastic fibrous sheet material, for example Novelin (Trade Mark) US 15 dry-laid polypropylene/viscose nonwoven fabric (base weight 15 g/m²), fusion-bonded onto the core 4. The outer surfaces of each substrate have the flattened coalesced areas characteristic of the invention.

The inner sides of the substrates 2 and 3 also carry fusion-bonded layers 6 of the same lightweight thermoplastic material, and the two substrates 2 and 3 are heat-sealed together, by way of these adjacent thermoplastic layers 6, along their edge regions 7 and also in a grid pattern 8, indicated in FIG. 1 by dotted lines, to form a plurality of compartments 9, each approximately 1.3×1.3 cm, each containing a 1 cm×1 cm sqaure 10 of porous polymeric material, which carries a liquid active material. For clarity the thickness of the article 1 in comparison to its surface area has been greatly exaggerated.

Figure 3:
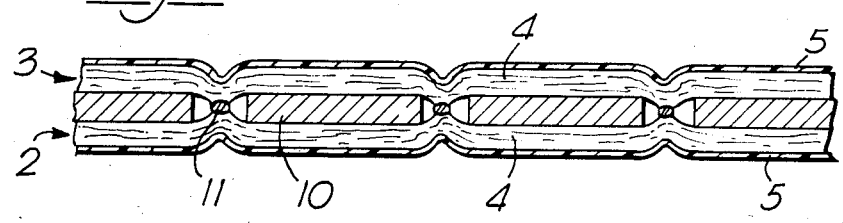
FIG. 3 is a fragmentary section, corresponding to FIG. 2, of a second article.

FIG. 3 shows an alternative article in which only the outer sides of the substrates 2 and 3 carry the fusion-bonded surface layers 5 of lightweight thermoplastic fibrous sheet material. The substrates 2 and 3 are bonded together by means of adhesive 11 which has previously been applied to one or both substrates along the edge regions 7 and in the grid pattern 8.

Figure 4:
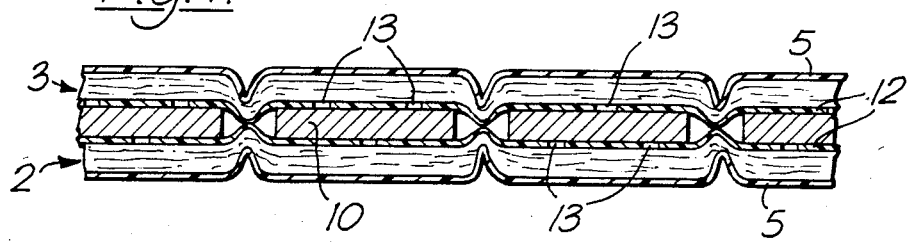
FIG. 4 is a fragmentary section, corresponding to FIG. 2, of a third article according to the invention.

FIG. 4 shows yet another article, in which each of the substrates 2 and 3 carries on its inner side a thin polyethylene film 12 which is used to heat-seal the substrates together along the edge regions 7 and in the grid pattern 8. The film is provided with pinholes 13 for the passage of liquid.

The porous polymer 10 is advantageously a high void volume polystyrene as described in the aforementioned EP 68 830, and the liquid active material may be, for example, a composition for cleaning glossy hard surfaces to give a streak-free result. In use, a sufficient quantity of liquid may be delivered by squeezing the wiping cloth to express liquid from the polymer into the substrates. If desired, the substrates may also be pre-impregnated with the liquid. The moistened cloth may be used to wipe a glossy hard surface such as a window or a mirror to leave that surface clean and streak-free.

The invention is further illustrated by the following non-limiting Examples.

EXAMPLE 1

A streak-free cleaning composition was prepared as follows:

|  | % |
|---|---|
| Nonionic surfactant (tallow alcohol 18 EO) | 0.1 |
| Isopropanol | 10.0 |
| Demineralised water | to 100.0 |

The surface tension of this composition was approximately 37 mNm$^{-1}$ and on drying from a glossy surface it left on droplets larger than 0.1 μm.

Three sets of substrates (A, B and C) were prepared. Those of the first set A, each consisted of a single layer of Hi-Loft (Trade Mark) 3051 lofty low-density wet-strength paper (base weight 85 g/m², porosity 92), while the substrates of sets B and C each consisted of an inner layer of Hi-Loft having fusion-bonded to each side a layer of Novelin (Trade Mark) US 15 dry-laid polypropylene/viscose nonwoven fabric; the fusion-bonding was effected by passing the three layers together between heated rollers. The substrates of set B were lightly fusion-bonded so that the fibres of the outer layer substantially retained their fibrous identity, whereas those of set C were more firmly fusion-bonded so that the fibres at the outer surface substantially lost their fibrous identity and coalesced to form flat regions.

All the substrates were prewashed with the cleaning composition given above, to remove streak-forming impurities, and then impregnated to known levels.

The streak-free cleaning performances of the various impregnated substrates were compared using the following test. A clean 1 m² area of glass was sprayed, using a Humbrol spray gun, with a model soil simulating a typical airborne soil in a kitchen environment:

|  | % |
|---|---|
| Tripalmitin | 1.0 |
| Glycerol trioleate | 0.5 |
| Kaolin | 0.5 |
| Palmitic acid | 0.2 |
| Paraffin oil | 0.2 |
| Carbon black | 0.005 |
| Genklene (Trade Mark) solvent (chlorinated hydrocarbon) ex ICI | to 100 |

The articles prepared as described above were then used by an experienced operator to clean the surface to give as streak-free as possible an end result, the process being repeated over a number of soil-clean cycles until product failure, either from drying out or from excessive streaking, was observed. During the test the weight of liquid used to carry out the cleaning and the weight of soil deposited were measured, and the streakiness of the surface was rated by the operator according to the following system:

| 0 | = | no streaks |
| 1 | = | at most a few very light streaks, only seen under strong lighting conditions at critical angles |
| 2 | = | slight but fairly well distributed streaks, again best seen under strong lighting conditions |
| 3 | = | streaks over entire surface which can be observed quite easily at all angles of view |
| 4 | = | very streaky end result, generally appearing more like smears than lines. |

The results are shown in Table 2. Linting occurred with the substrates of set A, but not with those of sets B and C, showing that the presence of the outer layer was effective to prevent linting.

TABLE 2

| Cycle | Liquid used (g) | Soil level (g/m² glass) | Score | Comments |
|---|---|---|---|---|
| Set A |  |  |  |  |
| 1 | 1.86 | 0.036 | 0 | good non-streak |
| 2 | 1.52 | 0.044 | 1 | very light streaks |
| 3 | 1.00 | 0.039 | 2 | wipe too dry, poor result |
| Set B |  |  |  |  |
| 1 | 1.89 | 0.031 | 0–1 | slight streaks, required a finishing wipe |
| 2 | 2.44 | 0.021 | 0–1 | reasonable, but more finishing required |
| 3 | 0.80 | 0.042 | 1–2 | slight streaks, difficult to |

TABLE 2-continued

| Cycle | Liquid used (g) | Soil level (g/m² glass) | Score | Comments |
|---|---|---|---|---|
| 4 | 1.45 | 0.039 | 2 | finish slight streaks, difficult to finish |
| 5 | 1.41 | 0.036 | 2 | slight streaks, hard to finish |
| Set C | | | | |
| 1 | 1.19 | 0.050 | 0 | easy, good result |
| 2 | 1.47 | 0.042 | 0-1 | fairly easy, good result |
| 3 | 0.77 | 0.028 | 0-1 | dryish, good result |
| 4 | 1.06 | 0.020 | 0-1 | dryish, missing patches, good result |

The improved performance of Set C, where the fusion-bonding was such as to give flat surface regions, will be noted.

EXAMPLE 2

The procedure of Example 1 was repeated using the same cleaning composition and three sets of substrates D, E and F.

The substrates of the first set D each consisted of a single layer of Mitsubishi (Trade Mark) TCF spunlaced viscose nonwoven fabric (base weight 40 g/m², porosity 90); this is a material having very long fibres and with no tendency to linting. The set E substrates each consisted of a layer of Mitsubishi TCF having fusion-bonded to each side a layer of Novelin (Trade Mark) S 15 (similar to the Novelin US 15 of Example 1); and the set F substrates each consisted of a single layer of Mitsubishi TCF having fusion-bonded to each side a layer of Corovin (Trade Mark) P PS MED, a heat-sealable lightweight nonwoven fabric. Optical microscopy showed that the composite substrates of set F had more flat regions on their outer surfaces than did those of set E.

As expected, linting was not observed with any of the three sets of substrates. Nevertheless, the streak-free cleaning results were substantially improved by the presence of the fusion-bonded layer, the improvement being greater in Set F where a higher proportion of flat areas was present.

The results are shown in Table 3.

TABLE 3

| Cycle | Wt of liquid used | Soil level | Score | Comments |
|---|---|---|---|---|
| Set D | | | | |
| 1 | 3.03 | 0.029 | 4 | heavy streaking; impossible to obtain streak-free result. |
| Set E | | | | |
| 1 | 3.94 | 0.026 | 2 | slight streaks, easier to use than D. |
| 2 | 2.03 | 0.025 | 2 | slight streaks; easier to use than D. |
| Set F | | | | |
| 1 | 2.42 | 0.025 | 1 | very slight streaks, easy to finish off. |
| 2 | 1.82 | 0.012 | 1 | very slight streaks, |

TABLE 3-continued

| Cycle | Wt of liquid used | Soil level | Score | Comments |
|---|---|---|---|---|
| | | | | easier to use than E |

EXAMPLE 3

The procedure of Example 1 was repeated using the same cleaning composition and two sets of substrates G and H.

The substrates of the first set G each consisted of a single untreated sheet of XLA 150 ex Bonded Fibre Fabric Ltd (base weight 150 g/m², porosity 97).

The substrates of set H consisted of a sheet of XLA 150 that had been subjected on one side to a heat and pressure treatment, using a domestic iron on a high setting, such that the fibres at the outer siurface substantially lost their fibrous identity and coalesced to form flat regions. The ironed surface had a smooth feel and a glossy appearance, and the whole sheet of XLA 150 had a substantially reduced thickness owing to compression caused by the heat and pressure treatment.

The results of the streak-free cleaning test are shown in Table 4. A small amount of linting, insufficient to interfere with the cleaning effect, was observed with both sets of substrates.

The improved streak-free results obtained from set H will be noted.

TABLE 4

| Cycle | Liquid used (g) | Soil level (g/m² glass) | Score | Comments |
|---|---|---|---|---|
| Set G | | | | |
| 1 | 2.39 | 0.036 | 0-1 | Good |
| 2 | 1.76 | 0.031 | 1 | Very slight streaking |
| 3 | 2.47 | 0.033 | 1 | Very slight streaking |
| 4 | 2.00 | 0.026 | 2 | Streaking |
| Set H | | | | |
| 1 | 4.60 | 0.048 | 0 | Good, easy to use |
| 2 | 4.12 | 0.064 | 0-1 | " |
| 3 | 4.64 | 0.055 | 0-1 | Good, extremely slight streaking |
| 4 | 4.50 | 0.042 | 1 | Very very slight streaking |
| 5 | 3.18 | — | 2 | Slight streaking |
| 6 | 4.26 | 0.039 | 2 | Slight streaking |
| 7 | 2.82 | 0.034 | 2-3 | Streaking |

EXAMPLE 4

A further series of comparative tests was carried out using a Mitsubishi TCF material similar to that used in Example 2 but having a base weight of 60 g/m². Each substrate tested consisted of a core of this material having a layer of Corovin P PS MED, as used in Example 2, laminated onto one side only using heat and pressure so as to give a surface according to the invention. Each substrate was washed, and then impregnated, with the cleaning composition used in previous Examples. In each test, half of a soiled 1 m² window was cleaned with the side of the substrate carrying the Corovin layer, and then the other half cleaned with the other side. A repeat test was then carried out in the reverse order so as to eliminate any variation due to the change in liquid loading. The results, using the same scoring system as in the previous Examples, are shown in Table 5. This direct comparison shows clearly the streak-free cleaning benefit associated with the Corovin surface.

TABLE 5

| Test | Laminated side Score | Laminated side Comments | Uncovered side Score | Uncovered side Comments |
|---|---|---|---|---|
| 1 | 1-2 | Very slight streaks | 3-4 | Very streaky |
| 2 | 1 | Very slight streaks | 2 | Streaking easily seen |
| 3 | 1 | Very slight streaks | 2-3 | Streaking easily seen |
| 4 | 2 | Slight streaks | 2 | Slight streaks |
| 5 | 1 | Very slight streaks | 3 | Streaky |
| 6 | 1 | Very slight streaks | 2-3 | Streaky |
| 7 | 1-2 | Slightly streaky | 2-3 | Streaky |

We claim:

1. An article suitable for wiping surfaces, said article comprising a sheet substrate carrying a liquid active material and having
   (a) a core of bulky high-porosity fibrous sheet material having a base weight of at least 30 g/m², said core containing said liquid active material,
   (b) at least one external wiping surface having open areas and having flattened areas of thermoplastic fibres coalesced by the application of heat and pressure to such an extent as substantially to lose their fibrous identity.

2. The article of claim 1, wherein the core material (a) comprises paper or nonwoven fabric having a porosity of from 80 to 99%.

3. The article of claim 2, wherein the core material (a) comprises paper or nonwoven fabric having a porosity of from 85 to 95%.

4. The article of claim 1, wherein the core material (a) comprises lofty paper or nonwoven fabric.

5. The article of claim 1, wherein the core material (a) has a base weight of from 40 to 150 g/m².

6. An article suitable for wiping surfaces, said article comprising a sheet substrate carrying a liquid active material and having
   (a) a core of bulky high-porosity fibrous sheet material having a base weight of at least 30 g/m², said core containing said liquid active material,
   (b) an outer surface layer of heat-sealable fibrous sheet material containing at least 30% by weight of thermoplastic fibres and having a base weight of from 8 to 25 g/m², fusion-bonded to said core by the application of heat and pressure to such an extent that thermoplastic fibres at its outer surface substantially lose their fibrous identity and are coalesced into flattened areas, whereby an external wiping surface having said flattened areas and open areas is provided.

7. The article of claim 6, wherein said heat-sealable fibrous sheet material has a base weight within the range of from 10 to 20 g/m².

8. The article of claim 6, wherein said heat-sealable fibrous sheet material comprises dry-laid nonwoven fabric.

9. The article of claim 1, wherein the substrate is impregnated with the liquid active material.

10. The article of claim 1, wherein the substrate carries the liquid active material in controlled-release form.

11. The article of claim 10, wherein the liquid active material is carried by the substrate within a controlled-release medium that will release liquid active material on the application of pressure thereto.

12. The article of claim 10, wherein the liquid active material is carried by the substrate within a controlled-release medium sandwiched between it and a second substrate.

13. The article of claim 10, wherein the liquid active material is carried within a controlled-release medium selected from the group consisting of highly porous polymers, microcapsules, and combinations thereof.

14. The article of claim 1, wherein the liquid active material comprises a homogeneous aqueous solution having a surface tension of less than 45 mNm$^{-1}$ which, when applied to a surface and allowed to dry, dries substantially without forming discrete droplets or particles larger than 0.25 μm.

15. The article of claim 1, wherein the liquid active composition includes an ingredient selected from the group consisting of nonionic surfactants, lower alcohols and mixtures thereof.

16. The article of claim 6, wherein said heat-sealable fibrous sheet material comprises both thermoplastic and non-thermoplastic fibers.

* * * * *